(12) United States Patent
Fernandez et al.

(10) Patent No.: US 12,538,455 B2
(45) Date of Patent: Jan. 27, 2026

(54) THERMAL MANAGEMENT FOR PATIENT MONITOR

(71) Applicant: Drägerwerk AG & Co. KGaA, Lübeck (DE)

(72) Inventors: Ricardo Luis Fernandez, Beverly, MA (US); Zachary K. Hennings, Reading, MA (US); Peter A. Lund, Nashua, NH (US); Andrew Thomas Provencher, Lowell, MA (US)

(73) Assignee: Drägerwerk AG & Co. KGaA, Lübeck (DE)

( * ) Notice: Subject to any disclaimer, the term of this patent is extended or adjusted under 35 U.S.C. 154(b) by 205 days.

(21) Appl. No.: 18/270,085

(22) PCT Filed: Dec. 30, 2021

(86) PCT No.: PCT/EP2021/087837
§ 371 (c)(1),
(2) Date: Jun. 28, 2023

(87) PCT Pub. No.: WO2022/144412
PCT Pub. Date: Jul. 7, 2022

(65) Prior Publication Data
US 2024/0081027 A1    Mar. 7, 2024

Related U.S. Application Data

(60) Provisional application No. 63/132,136, filed on Dec. 30, 2020.

(51) Int. Cl.
*H05K 7/20*      (2006.01)
*G06F 1/20*      (2006.01)

(52) U.S. Cl.
CPC ........... *H05K 7/2039* (2013.01); *G06F 1/203* (2013.01)

(58) Field of Classification Search
CPC ........ G06F 1/203; G06F 1/1626; G06F 1/181; G06F 1/20; G06F 1/1656; G06F 1/1698;
(Continued)

(56) References Cited

U.S. PATENT DOCUMENTS 5,515,303 A * 5/1996 Cargin, Jr. ............ G06F 3/0231
                                                        705/28
6,144,552 A * 11/2000 Whitcher .......... G02F 1/133308
                                                        345/905

(Continued)

OTHER PUBLICATIONS

European Patent Office, The International Search Report and The Written Opinion of the International Searching Authority, Apr. 25, 2022, for International Application No. PCT/EP2021/087837.

*Primary Examiner* — Michael A Matey
(74) *Attorney, Agent, or Firm* — Nolte Lackenbach Siegel (57) ABSTRACT

A thermal enclosure for a computer having a processor and a display is disclosed and may include an inner case. The thermal enclosure may further include a heat sink attached to the inner case and thermally connected to the processor. The heat sink may have an outer heat dissipation channel. The thermal enclosure may also include an outer housing that at least partially the envelops the inner case. The outer housing may have a rear housing portion and a front housing portion. The rear housing portion, the front housing portion, and the outer heat dissipation channel may define a heat dissipation opening that may have an overall width, W, and an overall depth, D, the outer heat dissipation channel may be recessed within the heat dissipation opening and W and D may be adapted to prevent a human finger from coming into contact with the outer heat dissipation channel.

14 Claims, 6 Drawing Sheets

(58) Field of Classification Search
CPC .......... G06F 1/184; G06F 1/1637; G06F 1/16; G06F 1/1613; G06F 1/1632; G06F 1/206; G06F 2200/1612; A61B 8/4444; G16H 40/20; H04B 1/036; H04W 88/02; H05K 1/0204; H05K 5/0217; H05K 7/14; H05K 7/20154; H05K 7/20172; H05K 7/20336; H05K 7/2039; H05K 7/20436; H05K 7/20445; H05K 9/0049

See application file for complete search history.

(56) References Cited

U.S. PATENT DOCUMENTS

| | | | | |
|---|---|---|---|---|
| 8,351,194 | B2* | 1/2013 | Ku | G06F 1/181 361/707 |
| 8,599,552 | B2* | 12/2013 | Lee | G06F 1/184 361/679.02 |
| 8,724,331 | B2* | 5/2014 | Chu | H02G 3/14 361/728 |
| 9,615,793 | B2 | 4/2017 | Solosko et al. | |
| 10,835,106 | B1 | 11/2020 | Ubbesen et al. | |
| 2008/0037222 | A1* | 2/2008 | Jha | H05K 7/20445 361/709 |
| 2016/0291650 | A1* | 10/2016 | Lee | G06F 1/1626 |
| 2020/0107473 | A1* | 4/2020 | Tanabe | G06F 1/1626 |
| 2021/0153382 | A1* | 5/2021 | Saroor | G06F 1/206 |
| 2021/0216119 | A1* | 7/2021 | Kuo | G06F 1/203 |

* cited by examiner

THERMAL MANAGEMENT FOR PATIENT MONITOR

CROSS-REFERENCE TO RELATED APPLICATIONS

This application is a national stage application of International Patent Application No. PCT/EP2021/087837 filed on Dec. 30, 2021, under 35 U.S.C. § 371, which International application claimed the benefit of U.S. Prov. Pat. App. Ser. No. 63/132,136, filed on Dec. 30, 2020. Priority to and the benefit of International Patent Application No. PCT/EP2021/087837 and U.S. Prov. Pat. App. Ser. No. 63/132,136 are hereby claimed for all purposes, including the right of priority. The content of U.S. Application Ser. No. 63/132,136 is hereby incorporated by reference for all purposes.

FIELD OF THE DISCLOSURE

The present disclosure relates generally to a patient monitor. More particularly, the present disclosure relates to a structure and method of dissipating heat generated by electronic component of the patient monitor.

BACKGROUND

Availability of patient physiological data is an important component of patient care. Portable, hand-held patient monitors are a useful tool in gathering such data, because they can move with the patient (and thus, continue the collection of physiological data) as the patient moves through the health care system. For example, a first responder can begin using the patient monitor in the field and that monitor can stay with the patient as the patient moves from the field, to an ambulance, to an emergency room, to an operating room, and then to a hospital room.

As portable patient monitors continue to be developed and improved, it has become desirable to increase the storage and computing power of such devices. Such improvements have lead to high heat loads and the need to improve heat dissipation. This presents a challenge in the context of portable patient monitors because of their relatively small size, the need to protect hospital patients and personnel from being exposed to hot surfaces, and the hygiene and cleaning requirements of equipment in a healthcare setting. In addition, due to the hygienic requirements of the hospital setting, the use of cooling fans is highly discouraged and thermal designs that rely on natural air convection are preferred. This requirement creates unique challenges to electronics cooling while maintaining the safety of patients, clinicians and staff. Accordingly, there is a need for a portable patient monitor that is capable of dissipating greater amounts of heat, while meeting these competing requirements.

SUMMARY

In an embodiment, a thermal enclosure for a computer having a processor and a display is disclosed and may include an inner case formed of a metallic material. The processor may be located within the inner case. The thermal enclosure may further include a heat sink attached to the inner case and thermally connected to the processor. The heat sink may have an outer heat dissipation channel. The thermal enclosure may also include an outer housing that at least partially the envelops the inner case, the outer housing being formed of a polymeric material. The outer housing may have a rear housing portion and a front housing portion. The rear housing portion, the front housing portion, and the outer heat dissipation channel define a heat dissipation opening that may have an overall width, W, and an overall depth, D, the outer heat dissipation channel may be recessed within the heat dissipation opening. W and D may be adapted to prevent a human finger from coming into contact with the outer heat dissipation channel.

In another embodiment, a patient monitoring device is disclosed and may include an outer housing that may have a rear housing portion and a front housing portion and an inner case at least partially disposed within the rear housing portion of the outer housing and enclosed by the front housing portion. The inner case may include a plurality of auxiliary ports adapted to receive cables from a plurality of physiological sensors. The patient monitoring device may further include a processor disposed within the inner case and a heat sink disposed between the front housing portion of the outer housing and the inner case. The heat sink may include an outer heat dissipation channel around an outer periphery of the heat sink, wherein the heat dissipation channel may be in direct contact with ambient air to dissipate from the processor within the inner case.

In still another embodiment, a patient monitor assembly is disclosed and may include a patient monitoring device. The patient monitoring device may include an outer housing having a rear housing portion and a front housing portion and an inner case at least partially disposed within the rear housing portion of the outer housing and enclosed by the front housing portion. The inner case may include a plurality of auxiliary ports adapted to receive cables from a plurality of physiological sensors. Further, the patient monitoring device may include a heat sink that may be disposed between the front housing portion of the outer housing and the inner case. The heat sink may include an outer heat dissipation channel. The patient monitor assembly may also include a support bracket that may be adapted to receive the patient monitoring device and engage the heat sink to facilitate removal of heat from the patient monitoring device.

BRIEF DESCRIPTION OF THE DRAWINGS

In the drawings, like reference numbers generally indicate identical, functionally similar, and/or structurally similar elements.

DETAILED DESCRIPTION

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise stated. Additionally, the terms "comprises" and "comprising" when used herein specify that certain features are present in that embodiment, but should not be interpreted to preclude the presence or addition of additional features, components, operations, and/or groups thereof.

The following disclosure is intended to be read in connection with the accompanying drawings, which are to be considered part of the entire written description of the invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

Figure 1:
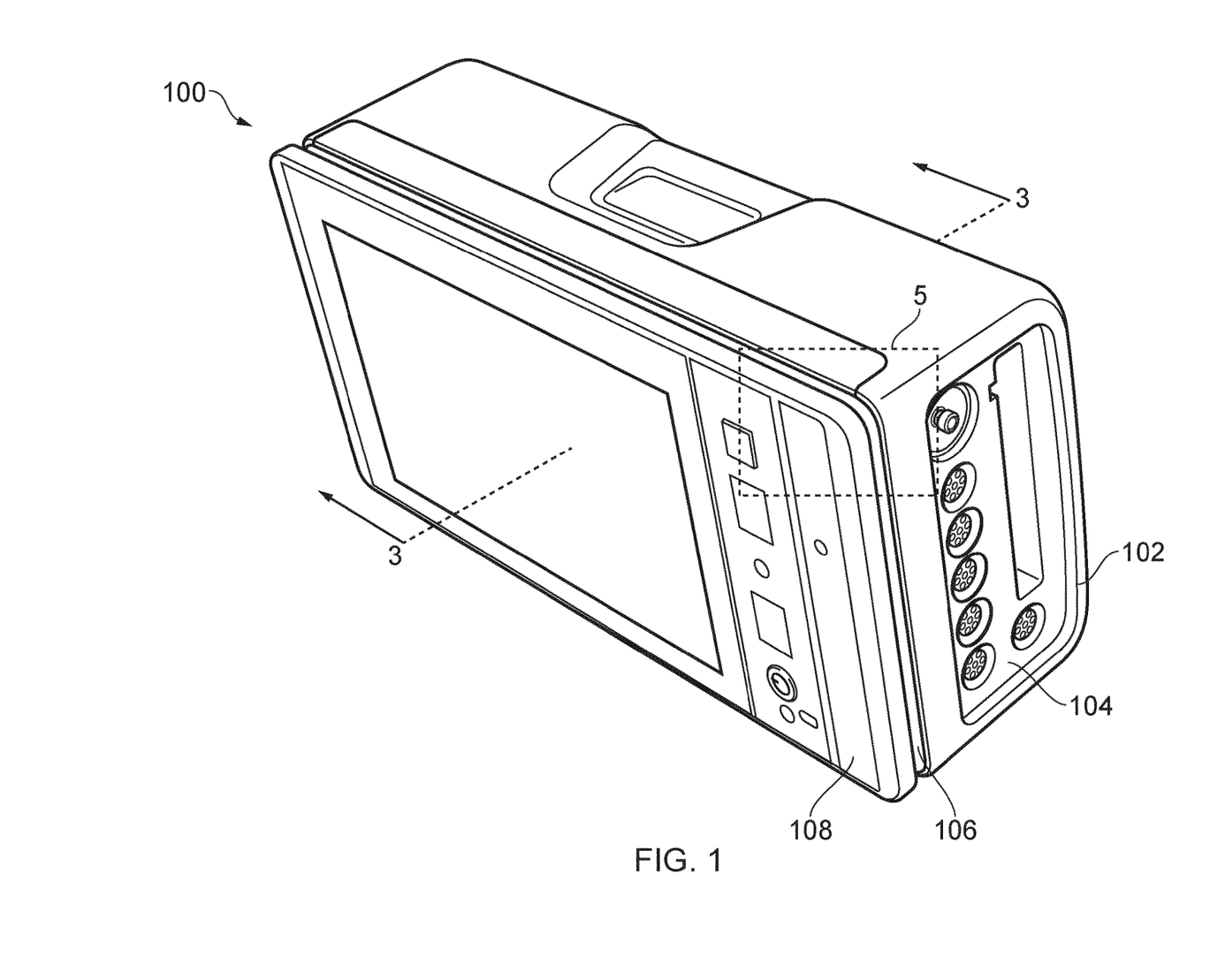
FIG. 1 a perspective view of a portable patient monitor according to an embodiment.

Referring initially to FIG. 1, a portable patient monitor 100 is illustrated. In general, the patient monitor 100 may include a rear housing portion 102, an inner case 104, a heat sink 106, and a user interface module 108. The inner case 104 may fit into the rear housing portion 102. The heat sink 106 may abut the inner case 104. Moreover, the user interface module 108 may be installed adjacent to the heat sink 106. The assembly of these components relative to each other is described in greater detail below.

Figure 2:
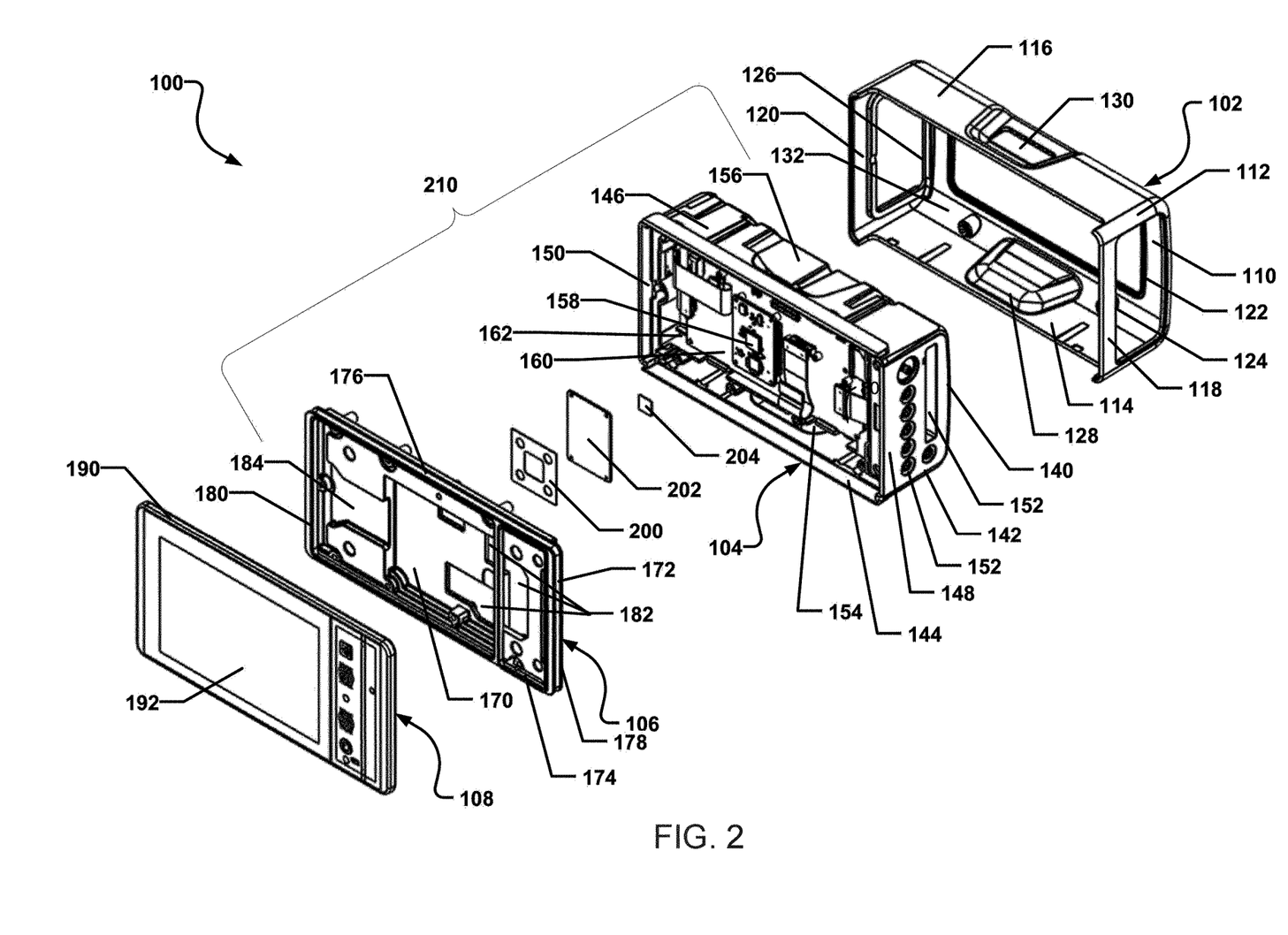
FIG. 2 is an exploded view of a portable patient monitor according to an embodiment.

FIG. 2 shows further details of the portable patient monitor 100. As illustrated, the rear housing portion 102 of the monitor 100 may include a back plate 110. An outer wall 112 may extend from the back plate 110. In particular, the outer wall 112 may extend from an outer perimeter of the back plate 110 in a direction that may be forward relative to the back plate 110 and substantially perpendicular to the back plate 110. The outer wall 112 of the rear housing portion 102 may include a lower wall portion 114 that may extend in a direction that may be substantially perpendicular to the back plate 110. The outer wall 112 of the rear housing portion 102 may also include an upper wall portion 116 opposite the lower wall portion 114 and spaced therefrom. The upper wall portion 116 of the outer wall 112 of the rear housing portion 102 may extend in a direction away from the back plate 110 in a direction that may be substantially perpendicular to the back plate 110 and substantially parallel to the lower wall portion 114.

As shown in FIG. 2, the outer wall 112 of the rear housing portion 102 may also include a left wall portion 118 that may extend between the lower wall portion 114 and the upper wall portion 116 of the outer wall 112 of the rear housing portion 102. The left wall portion 118 may extend from the back plate 110 in a direction that may be substantially perpendicular to the back plate 110. The left wall portion 118 may also be substantially perpendicular to the lower wall portion 114 and the upper wall portion 116. The outer wall 112 of the rear housing portion 102 may also include a right wall portion 120 that may extend between the lower wall portion 114 and the upper wall portion 116 of the outer wall 112 of the rear housing portion 102 opposite and spaced from the left wall portion 118. The right wall portion 120 may extend from the back plate 110 in a direction that may be substantially perpendicular to the back plate 110. The right wall portion 120 may also be substantially perpendicular to the lower wall portion 114 and the upper wall portion 116.

FIG. 2 further shows that the back plate 110 of the rear housing portion 102 may be formed with a rear housing opening 122. The rear housing opening 122 may provide access to one or more optical sensors (not shown) on the back of the inner case 104, one or more labels (not shown) on the back of the inner case 104, or a combination thereof. The left wall portion 118 of the outer wall 112 of the rear housing portion 102 may be formed with a left housing opening 124. The left housing opening 124 that may provide access to one or more connector ports, described below, on the inner case 104. Further, the right wall portion 120 of the outer wall 112 of the rear housing portion 102 may be formed with a right housing opening 126. The right housing opening 126 may provide access to a battery (not shown) within the inner case 104.

As further illustrated in FIG. 2, the lower wall portion 114 of the outer wall 112 of the rear housing portion 102 may be formed with a lower interlocking recess 128. Moreover, the upper wall portion 116 of the outer wall 112 of the rear housing portion 102 may be formed with an upper interlocking recess 130. As described in greater detail below, the interlocking recesses 128, 130 of the rear housing portion 102 may engage corresponding features formed on the inner case 104. The rear housing portion 102 may also include an interior 132 bound by the outer wall 112 of the rear housing portion 102 and the back plate 110 of the rear housing portion 102.

In a particular aspect, the rear housing portion 102 may be constructed from a thermally insulating material. The thermally insulating material may include a thermally insulating polymeric material, e.g., a thermally insulating plastic. For example, the thermally insulating plastic may include acrylonitrile butadiene styrene (ABS) plastic, chlorinated polyvinyl chloride (CPVC) plastic, high density polyethylene (HDPE) plastic, high impact polystyrene (HIPS) plastic, low density polyethylene (LDPE) plastic, linear low density polyethylene (LLDPE) plastic, polyetheretherketone (PEEK) plastic, polyethylene terephthalate (PET) plastic, polymethylmethacrylate/acrylic (PMMA) plastic, polyoxymethylene (POM) plastic, polypropylene (PP) plastic, polycarbonate (PC), acrylonitrile butadiene styrene (ABS), polyethylene terephthalate (PET) and/or modifications (e.g., glycol-modified), polycyclohexylenedimethylene terephthalate (PCT) and/or modifications (e.g., glycol-modified), polyamide (PA), polybutylene terephthalate (PBT), Polyphenol sulfone (PPSU), or a combination thereof.

The thermally insulating material may have a thermal conductivity coefficient, k, (W/(mK)) greater than or equal to 0.100. Further, k may be greater than or equal to 0.110, such as greater than or equal to 0.130, greater than or equal to 0.140, greater than or equal 0.160, greater than or equal 0.190, greater than or equal 0.200, greater than or equal 0.220, or greater than or equal 0.250. In another aspect, k may be less than or equal to 0.500, such as less than or equal to 0.450, less than or equal to 0.370, less than or equal to 0.350, less than or equal to 0.320, less than or equal to 0.310, or less than or equal to 0.300. In another aspect, k may be within a range between, and including, any of the minimum and maximum values of k described herein.

Still referring to FIG. 2, the inner case 104 of the monitor 100 may include a back plate 140. An outer wall 142 may extend from the back plate 140. In particular, the outer wall 142 may extend from an outer perimeter of the back plate 140 in a direction that may be forward and substantially perpendicular to the back plate 140. The outer wall 142 of the inner case 104 may include a lower wall portion 144 that may extend in a direction that may be substantially perpendicular to the back plate 140. The outer wall 142 of the inner case 104 may also include an upper wall portion 146 opposite the lower wall portion 144 and spaced therefrom. The upper wall portion 146 of the outer wall 142 of the inner case 104 may extend in a direction away from the back plate 140 in a direction that may be substantially perpendicular to the back plate 140 and substantially parallel to the lower wall portion 144.

As shown in FIG. 2, the outer wall 142 of the inner case 104 may also include a left wall portion 148 that may extend between the lower wall portion 144 and the upper wall portion 146 of the outer wall 142 of the inner case 104. The left wall portion 148 may extend from the back plate 140 in a direction that may be substantially perpendicular to the back plate 140. The left wall portion 148 may also be substantially perpendicular to the lower wall portion 144 and the upper wall portion 146. The outer wall 142 of the inner case 104 may also include a right wall portion 150 that may extend between the lower wall portion 144 and the upper wall portion 146 of the outer wall 142 of the inner case 104 opposite and spaced from the left wall portion 148. The right wall portion 150 may extend from the back plate 140 in a direction that may be substantially perpendicular to the back plate 140. The right wall portion 150 may also be substantially perpendicular to the lower wall portion 144 and the upper wall portion 146.

FIG. 2 further shows that the left wall portion 148 of the outer wall 142 of the inner case 104 may be formed with several connector port openings 152. The connector port openings 152 provide access to various connector ports, described below, within the inner case 104 of the monitor 100 and accessible via the rear housing portion 102. As further shown in FIG. 2, the lower wall portion 144 of the outer wall 142 of the inner case 104 may be formed with a lower interlocking recess 154. Moreover, the upper wall portion 146 of the outer wall 142 of the inner case 104 may be formed with an upper interlocking recess 156. When the monitor 100 is assembled as illustrated in FIG. 1, the interlocking recesses 128, 130 of the rear housing portion 102 may fit into and engage the interlocking recesses 154, 156 formed on the inner case 104. The monitor 100 may also include a processor, e.g., a central processing unit (CPU) 158 installed, or otherwise disposed, on a printed circuit board (PCB) 160 within an interior 162 of the inner case 104.

In a particular aspect, the inner case 104 may be constructed from a thermally conductive material. Further, the inner case 104 may be constructed from a thermally conductive metal. For example, the thermally conductive metal may include aluminum, copper, magnesium, zinc, tungsten, or a combination thereof. In another aspect, the thermally conductive material may include a thermally conductive metal alloy. The thermally conductive metal alloy may include aluminum alloy 1050, aluminum alloy 6060, aluminum alloy 6061, aluminum alloy 6063, brass, bronze, or a combination thereof. Note the numbers associated with the different types of aluminum alloy (e.g., 1050, 6060, 6061, 6063) are material designations that would be known to those of skill in the art and are not reference elements in any figures.

The thermally conductive material may have a thermal conductivity coefficient, k, (W/(mK)) greater than or equal to 50. Further, k may be greater than or equal to 100, such as greater than or equal to 125, or greater than or equal to 150. In another aspect, k may be less than or equal to 450, such as less than or equal to 400, less than or equal to 350, less than or equal to 300, less than or equal to 250, or less than or equal to 200. In another aspect, k may be within a range between, and including, any of the minimum and maximum values of k described herein.

As illustrated in FIG. 2, the heat sink 106 of the monitor 100 may include a back plate 170. An outer wall 172 may extend from the back plate 170. In particular, the outer wall 172 may extend from an outer perimeter of the back plate 170 in a direction that may be forward and substantially perpendicular to the back plate 170. The outer wall 172 of the heat sink 106 may include a lower wall portion 174 that may extend in a direction that may be substantially perpendicular to the back plate 170. The outer wall 172 of the heat sink 106 may also include an upper wall portion 176 opposite the lower wall portion 174 and spaced therefrom. The upper wall portion 176 of the outer wall 172 of the heat sink 106 may extend in a direction away from the back plate 170 in a direction that may be substantially perpendicular to the back plate 170 and substantially parallel to the lower wall portion 174.

As shown in FIG. 2, the outer wall 172 of the heat sink 106 may also include a left wall portion 178 that may extend between the lower wall portion 174 and the upper wall portion 176 of the outer wall 172 of the heat sink 106. The left wall portion 178 may extend from the back plate 170 in a direction that may be substantially perpendicular to the back plate 170. The left wall portion 178 may also be substantially perpendicular to the lower wall portion 174 and the upper wall portion 176. The outer wall 172 of the heat sink 106 may also include a right wall portion 180 that may extend between the lower wall portion 174 and the upper wall portion 176 of the outer wall 172 of the heat sink 106 opposite and spaced from the left wall portion 178. The right wall portion 180 may extend from the back plate 170 in a direction that may be substantially perpendicular to the back plate 170. The right wall portion 180 may also be substantially perpendicular to the lower wall portion 174 and the upper wall portion 176.

FIG. 2 further shows that the back plate 170 of the heat sink 106 may include several openings 182 through which the user interface module 108 may be electrically connected to the CPU 158 and other electrical components within the interior 162 of the inner case 104. As shown, the heat sink 106 may also include a relatively shallow interior 184 bound by the outer wall 172 of the heat sink 106 and the back plate 170 of the heat sink 106.

In a particular aspect, the heat sink 106 may be constructed from a thermally conductive material. Further, the heat sink 106 may be constructed from a thermally conductive metal. For example, the thermally conductive metal may include aluminum, copper, magnesium, zinc, tungsten, or a combination thereof. In another aspect, the thermally conductive material may include a thermally conductive metal alloy. The thermally conductive metal alloy may include aluminum alloy 1050, aluminum alloy 6060, aluminum alloy 6061, aluminum alloy 6063, brass, bronze, or a combination thereof. In a particular aspect, the heat sink 106 may be designed so that when the monitor 100 is assembled as described herein, the heat sink 106 may be as close to a CPU as possible to facilitate efficient heat transfer from the CPU to the heat sink 106 while avoiding any potential heat impedance.

In another particular aspect, the thermally conductive material may have a thermal conductivity coefficient, k, (W/(mK)) greater than or equal to 50. Further, k may be greater than or equal to 100, such as greater than or equal to 125, or greater than or equal to 150. In another aspect, k may be less than or equal to 450, such as less than or equal to 400, less than or equal to 350, less than or equal to 300, less than or equal to 250, or less than or equal to 200. In another aspect, k may be within a range between, and including, any of the minimum and maximum values of k described herein.

Still referring to FIG. 2, the user interface module 108 may include a front housing portion 190. A touch display screen 192 may be disposed within the front housing portion 190. When the monitor 100 is assembled as described herein, the front housing portion 190 and the rear housing portion 102 may make up an outer housing that may be made from the same material as the rear housing portion 102 and the front housing portion 190.

In a particular aspect, the front housing portion 190 may be constructed from a thermally insulating material. The thermally insulating material may include a thermally insulating polymeric material, e.g., a thermally insulating plastic. For example, the thermally insulating plastic may include acrylonitrile butadiene styrene (ABS) plastic, chlorinated polyvinyl chloride (CPVC) plastic, high density polyethylene (HDPE) plastic, high impact polystyrene (HIPS) plastic, low density polyethylene (LDPE) plastic, linear low density polyethylene (LLDPE) plastic, polyetheretherketone (PEEK) plastic, polyethylene terephthalate (PET) plastic, polymethylmethacrylate/acrylic (PMMA) plastic, polyoxymethylene (POM) plastic, polypropylene (PP) plastic, or a combination thereof.

The thermal insulating material may have a thermal conductivity coefficient, k, (W/(mK)) greater than or equal to 0.100. Further, k may be greater than or equal to 0.110, such as greater than or equal to 0.130, greater than or equal to 0.140, greater than or equal 0.160, greater than or equal 0.190, greater than or equal 0.200, greater than or equal 0.220, or greater than or equal 0.250. In another aspect, k may be less than or equal to 0.500, such as less than or equal to 0.450, less than or equal to 0.370, less than or equal to 0.350, less than or equal to 0.320, less than or equal to 0.310, or less than or equal to 0.300. In another aspect, k may be within a range between, and including, any of the minimum and maximum values of k described herein.

With reference to FIG. 2, when the portable patient monitor 100 is assembled as depicted in FIG. 1, the user interface module 108 may be partially fitted into the shallow interior 184 of the heat sink 106. The user interface module 108 may be held in place with one or more machine screws (not shown). Further, as indicated in FIG. 2, the monitor 100 may include a thermal gap pad 200 (which is form of a thermal interface) between a heat spreader plate 202 (another form of a thermal interface) and the heat sink 106. The heat spreader plate 202 may be constructed from a thermally conductive material. Moreover, the heat spreader plate 202 may be constructed from a thermally conductive metal that is different from the thermally conductive materials used for the other thermal interfaces shown. The heat spreader plate 202 functions to spread heat from the CPU 158 over a larger area, as well as to provide a protective cover for the CPU 158, and the thermal gap pad 200 provides a strong seal between the heat spreader 202 and the heat sink 106 to ensure optimal heat dissipation. A phase change material may be used to provide for thermal interface 204 that is also preferably provided between the CPU 158 and the heat spreader plate 202 to help stabilize the temperature of the CPU 158 and provide a strong thermal connection between the CPU 158 and the heat spreader plate 202. Examples of suitable materials for the phase change material to make thermal interface 204 include salt-hydrates, n-alkanes, and non-paraffin organics. Thermal interphase 204 may also be constructed from other types of thermal interface material (e.g., materials that are thermally conductive).

For example, the thermally conductive material may include aluminum, copper, magnesium, zinc, tungsten, or a combination thereof. In another aspect, the thermally conductive material may include a thermally conductive metal alloy. The thermally conductive metal alloy may include aluminum alloy 1050, aluminum alloy 6060, aluminum alloy 6061, aluminum alloy 6063, brass, bronze, or a combination thereof.

The thermally conductive material may have a thermal conductivity coefficient, k, (W/(mK)) greater than or equal to 50. Further, k may be greater than or equal to 100, such as greater than or equal to 125, or greater than or equal to 150. In another aspect, k may be less than or equal to 450, such as less than or equal to 400, less than or equal to 350, less than or equal to 300, less than or equal to 250, or less than or equal to 200. In another aspect, k may be within a range between, and including, any of the minimum and maximum values of k described herein.

As further shown in FIG. 2, the monitor 100 may include a thermal interface 204 that may be sandwiched between the heat spreader plate 202 and the CPU 158 within the inner case 104. The thermal interface 204 may be a phase change material or made of silicon-based material embedded with conductive particles (e.g., Al, ceramic, or any type of conductive materials). The heat sink 106 may be assembled to the inner case 104 so that the heat sink 106 fits partially into the interior 162 of the inner case 104. One or more machine screws (not shown) may be used to assemble the heat sink 106 to the inner case 104. The user interface module 108 may be electrically connected, or coupled, to one or more electrical elements within the inner case 104 through the one or more openings 182 formed in the heat sink 106. It is to be understood that, when assembled as described herein, the combination, or assembly, of the inner case 104 and the heat sink 106 may be considered a thermal enclosure 210.

Moreover, the assembly of the user interface module 108, the heat sink 106, and the inner case 104 may be assembled with the rear housing portion 102 so that the inner case 104 of the monitor 100 fits into the interior 132 of the rear housing portion 102. Specifically, the inner case 104 fits into the interior 132 of the rear housing portion 102 so that the lower interlocking recess 128 formed in the lower wall portion 114 of the outer wall 112 of the rear housing portion 102 fits into and engages the lower interlocking recess 154 formed in the lower wall portion 144 of the outer wall 142 of the inner case 104. Further, the upper interlocking recess 130 formed in the upper wall portion 116 of the outer wall 112 of the rear housing portion 102 fits into and engages the upper interlocking recess 156 formed in the upper wall portion 146 of the outer wall 142 of the inner case. The inner case 104 may be held in place within the rear housing portion 102 via one or more machine screws (not shown).

Figure 3:
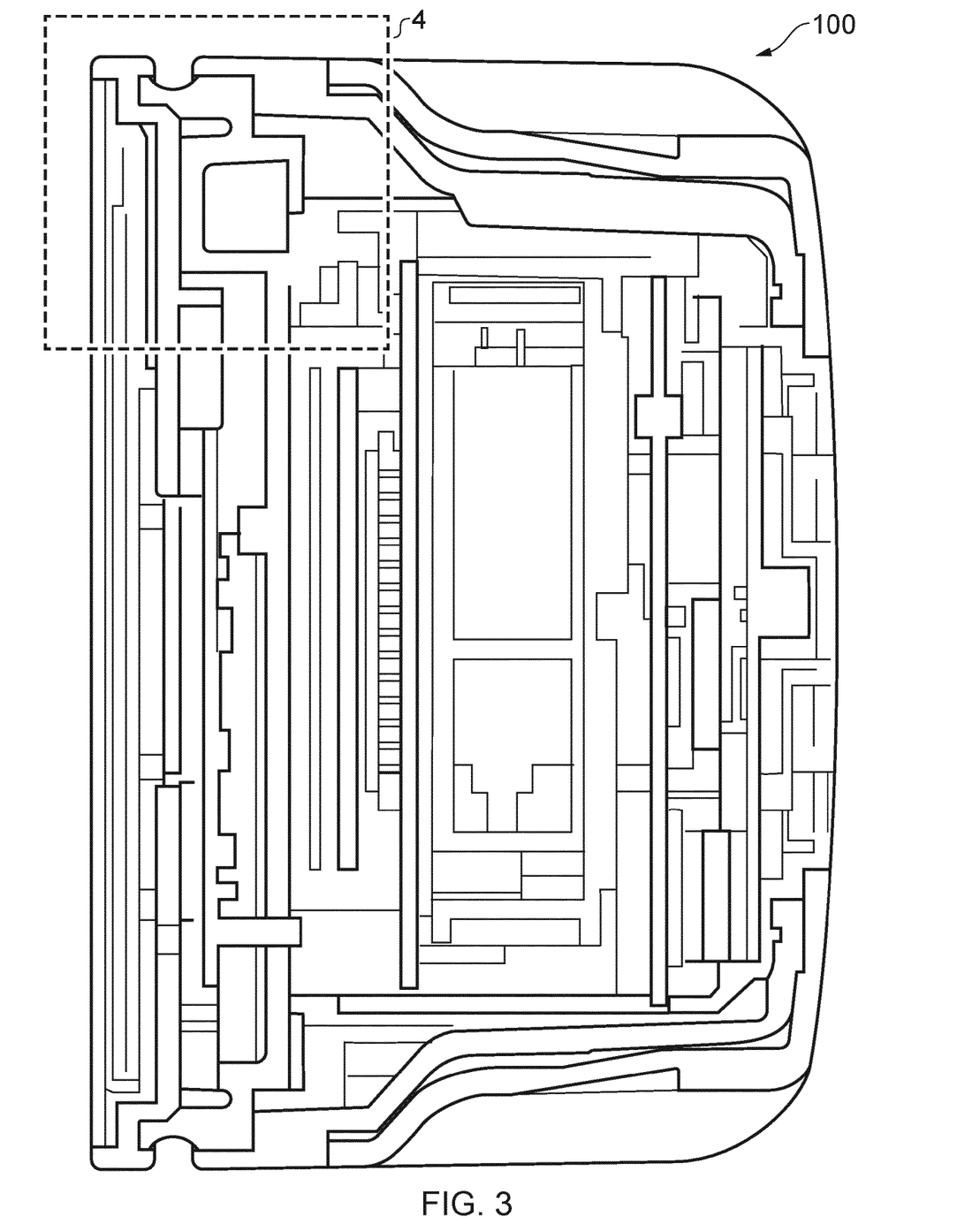
FIG. 3 is a cross-section view of a portable patient monitor according to an embodiment taken along line 3-3 in FIG. 1.
Figure 4:
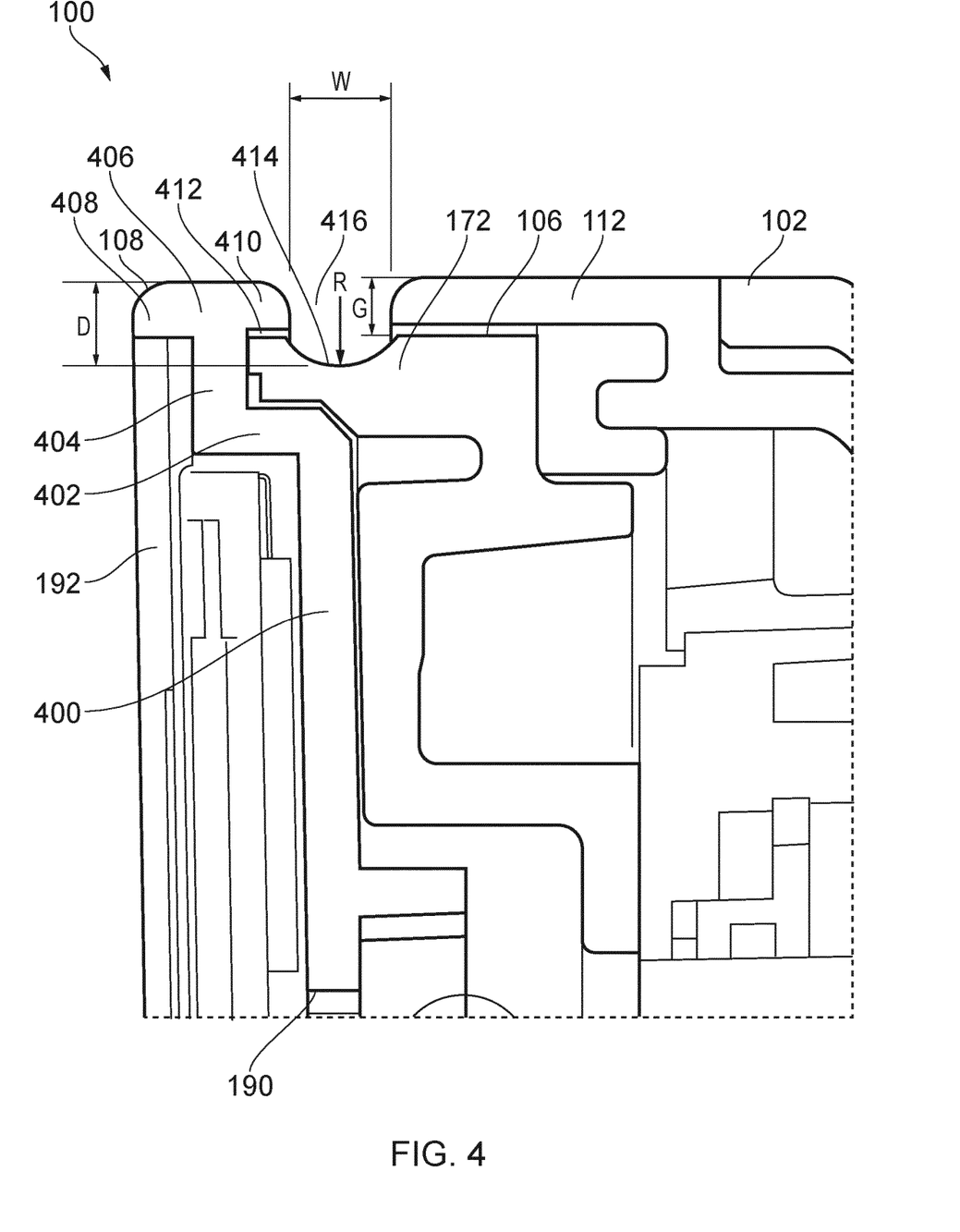
FIG. 4 is a detailed view of a portable patient monitor according to an embodiment taken at box 4 in FIG. 3.

Referring now to FIG. 3 and FIG. 4, further details of the assembled portable patient monitor 100 are illustrated. FIG. 4 is a detailed view of box 4 in FIG. 3. FIG. 4 shows that the front housing portion 190 may include a back plate 400. The back plate 400 of the front housing portion may include an inner wall 402 that may extend from a perimeter of the back plate 400. The inner wall 402 may extend from the back plate 400 in a direction that may be forward relative to the back plate 400 and substantially perpendicular to the back plate 400. As shown, a lateral flange 404 may extend from the inner wall 402 in a direction that may be outward relative to the inner wall 402 and substantially parallel to the back plate 400.

As further illustrated in FIG. 4, the front housing portion 190 may include an outer wall 406 that may extend from a perimeter of the lateral flange 404. The outer wall 406 of the front housing portion 190 may include a first portion 408 that may extend from the lateral flange 404 in a direction that may be forward relative to the lateral flange 404 and substantially perpendicular to the lateral flange 404 and the back plate 400. The first portion 408 of the outer wall 406 of the front housing portion 190 may fit around and engage the touch screen display 192 of the user interface module 108.

FIG. 4 also shows that the outer wall 406 of the front housing portion 190 may include a second portion 410 that may extend from the lateral flange 404 in a direction that may be rearward relative to the lateral flange 404 and substantially perpendicular to the lateral flange 404 and the back plate 400. A channel 412 may be established between the second portion 410 of the outer wall 406 of the front housing portion 190, the inner wall 402 of the front housing portion 190, and the lateral flange 404 of the front housing portion 190. The channel 412 may fit around and engage a portion of the outer wall 172 of the heat sink 106 while a portion of the front housing portion 190 fits into the interior 184 of the heat sink 106. Specifically, a distal end of the outer wall 172 of the heat sink 106 may fit into and engage the channel 412 formed in the front housing portion 190.

Figure 5:
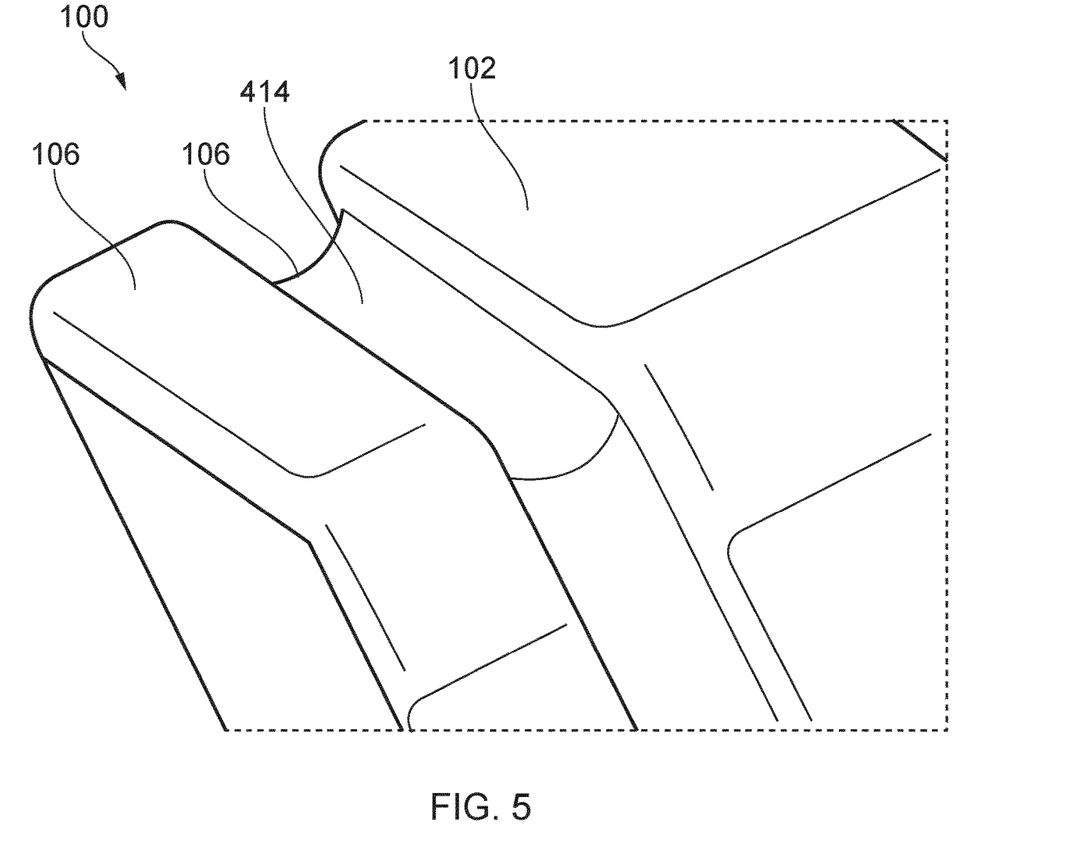
FIG. 5 is a detailed view of a portable patient monitor according to an embodiment taken at box 5 in FIG. 1.

Still referring to FIG. 4, the outer wall 172 of the heat sink 106 may be formed with a heat dissipation channel 414 near the distal end of the outer wall 172 of the heat sink 106. As depicted in FIG. 5, the heat dissipation channel 414 may extend around the entire outer periphery of the heat sink 106, e.g., around the outer periphery of the outer wall 172 of the heat sink 106. In other words, the heat dissipation channel 414 may be formed in an outer surface of the outer wall 172 of the heat sink 106. Accordingly, the heat dissipation channel 414 is continuous and may be formed in an outer surface of the lower wall portion 174 of the outer wall 172 of the heat sink, an outer surface of the left side wall portion 178 of the outer wall 172 of the heat sink 106, an outer surface of the upper wall portion 176 of the outer wall 172 of the heat sink 106, and an outer surface of the right side wall portion 180 of the outer wall 172 of the heat sink 106.

The heat dissipation channel 414 of the heat sink 106 may be sized and shaped to provide effective heat dissipation to ambient air. Further, the arrangement of the heat dissipation channel 414 of the heat sink 106 relative to the inner case 104 and the front housing portion 190 may substantially prevent a user or patient from touching the heat sink 106, e.g., the heat dissipation channel 414 formed therein. In one aspect, as shown in FIG. 4, the heat dissipation channel 414 may have a concave shape when viewed in cross-section. Further, the heat dissipation channel 414 may be smooth and easy to clean.

As shown in FIG. 4, the heat dissipation channel 414 may have a radius of curvature, R. R may be greater than or equal to 1.00 millimeters (mm). In another aspect, R may be greater than or equal to 1.25 mm, such as greater than or equal to 1.50 mm, greater than or equal to 1.75 mm, or greater than or equal to 2.00 mm. Moreover, R may be less than or equal to 3.50 mm, such as less than or equal to 3.25 mm, less than or equal to 3.00 mm, less than or equal to 2.75 mm, less than or equal to 2.50 mm, or less than or equal to 2.25 mm. In yet another aspect, R may be within a range between, and including, any of the minimum and maximum values of R described herein.

In a particular aspect, the heat dissipation channel 414, the rear housing portion 102, and the front housing portion 190 may establish a heat dissipation opening 416. As indicated in FIG. 4, the heat dissipation opening 416 may have an overall width, W. W may be measured from a lateral face of the second portion 410 of the outer wall 406 of the front housing portion 190 to a lateral face of the outer wall 112 of the rear housing portion 102. W may be greater than or equal to 3.00 mm. In another aspect, W may be greater than or equal to 3.25 mm, such as greater than or equal to 3.50 mm, greater than or equal to 3.75 mm, or greater than or equal to 4.00 mm. Moreover, W may be less than or equal to 6.00 mm, such as less than or equal to 5.75 mm, less than or equal to 5.50 mm, less than or equal to 5.25 mm, less than or equal to 5.00 mm, less than or equal to 4.75 mm, less than or equal to 4.50 mm, or less than or equal to 4.25 mm. In yet another aspect, W may be within a range between, and including, any of the minimum and maximum values of W described herein.

In another aspect, the heat dissipation opening 416 may have an overall depth, D. D may be measured from an outer, peripheral face of the outer wall 406 of the front housing portion 190 to a bottom of the heat dissipation channel 414, as viewed in FIG. 4. D may be greater than or equal to 2.50 mm. In another aspect, D may be greater than or equal to 2.75 mm, such as greater than or equal to 3.00 mm, greater than or equal to 3.25 mm, or greater than or equal to 3.50 mm. Moreover, D may be less than or equal to 6.00 mm, such as less than or equal to 5.75 mm, less than or equal to 5.50 mm, less than or equal to 5.25 mm, less than or equal to 5.00 mm, less than or equal to 4.75 mm, less than or equal to 4.50 mm, less than or equal to 4.25 mm, less than or equal to 4.00 mm, or less than or equal to 3.75 mm. In yet another aspect, D may be within a range between, and including, any of the minimum and maximum values of D described herein.

In still another aspect, the upper edge of the heat dissipation channel 414 is set back from the outer, peripheral face of the outer wall 112 of the rear housing portion 102 by a gap, G. G may be measured from an outer, peripheral face of the outer wall 406 of the front housing portion 190 to the upper edge of the heat dissipation channel 414, as viewed in FIG. 4. G may be greater than or equal to 1.50 mm. In another aspect, G may be greater than or equal to 1.75 mm, such as greater than or equal to 2.00 mm, greater than or equal to 2.25 mm, or greater than or equal to 2.50 mm. Moreover, G may be less than or equal to 5.00 mm, such as less than or equal to 4.75 mm, less than or equal to 4.50 mm, less than or equal to 4.25 mm, less than or equal to 4.00 mm, less than or equal to 3.75 mm, less than or equal to 3.50 mm, less than or equal to 3.25 mm, less than or equal to 3.00 mm, or less than or equal to 2.75 mm. In yet another aspect, G may be within a range between, and including, any of the minimum and maximum values of G described herein.

In a particular aspect, the arrangement of the inner case 104 and the heat sink 106, e.g., fastening the inner case 104 to the heat sink 106 to create a thermal enclosure 210 may provide the necessary force to establish a conductive path from the CPU 158 to the heat sink 106. For example, heat generated by the CPU 158 may be transferred with low impedance through the thermal interface 204 and the heat spreader plate 202 into the heat sink 106. The heat flux moves through the heat sink 106 to the heat dissipation channel 414. The heat dissipation channel 414 may be exposed to and have direct contact with ambient air and as such, the heat flux is radiated and dissipated into the ambient air via the exposed heat dissipation channel 414 and the heat dissipation opening 416. Within the thermal enclosure 210 heated bulk air may be conducted indirectly into the inner case 104 which may equilibrate the temperatures over the surface of the inner case 104 and may substantially eliminate any hot spots on the surface of the inner case 104. Any elevated temperatures on the inner case 104 may be isolated from a user, or patient, touch by the insulating layer of plastic provided by the outer cover 102.

Figure 6:
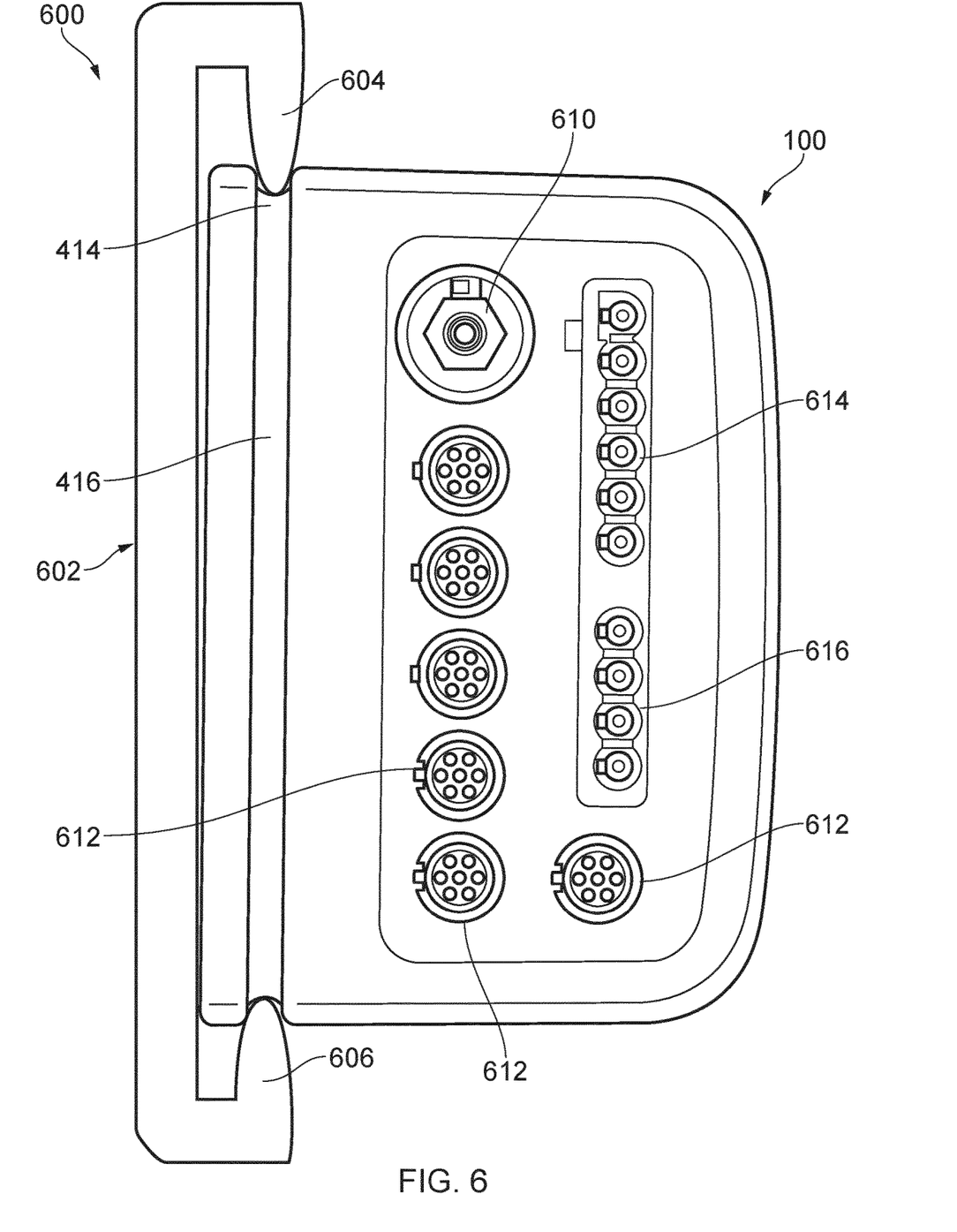
FIG. 6 is a plan view of a portable patient monitor assembly according to an embodiment.

Referring now to FIG. 6, a portable patient monitor assembly 600 is illustrated. As shown, the monitor assembly 600 may include a support bracket 602 and a portable patient monitor, e.g., the portable patient monitor 100 shown and described herein. FIG. 6 shows that the support bracket 602 may include an upper support structure 604 and a lower support structure 606. As indicated, the support structures 604, 606 may be sized and shaped to fit into the heat dissipation opening 416 formed on the monitor 100 and engage the heat dissipation channel 414 of the heat sink 106. The support structures 604, 606 of the support bracket 602 may engage the heat dissipation channel 414 in order to facilitate the removal of heat from within the monitor 100.

The support bracket 602 may be constructed from a thermally conductive material. Further, the support bracket 602 may be constructed from a thermally conductive metal. For example, the thermally conductive metal may include aluminum, copper, magnesium, zinc, tungsten, or a combination thereof. In another aspect, the thermally conductive material may include a thermally conductive metal alloy. The thermally conductive metal alloy may include aluminum alloy 1050, aluminum alloy 6060, aluminum alloy 6061, aluminum alloy 6063, brass, bronze, or a combination thereof.

The thermally conductive material may have a thermal conductivity coefficient, k, (W/(mK)) greater than or equal to 50. Further, k may be greater than or equal to 100, such as greater than or equal to 125, or greater than or equal to 150. In another aspect, k may be less than or equal to 450, such as less than or equal to 400, less than or equal to 350, less than or equal to 300, less than or equal to 250, or less than or equal to 200. In another aspect, k may be within a range between, and including, any of the minimum and maximum values of k described herein.

FIG. 6 also indicates that the inner case 104 of the monitor 100 may include a power port 610, one or more auxiliary connector ports 612, a first set of patient monitoring ports 614, and a second set of patient monitoring ports 616. One or more wires, or cables, may be connected to the monitor 100 via the ports 610, 612, 614, 616 to allow the monitor 100 to receive power and to receive, consolidate, and display patient information and data from one or more physiological sensors. The patient information, or physiological information received from the physiological sensors, may include electrocardiograph (ECG) data, respiratory rate, noninvasive blood pressure (NI BP), invasive blood pressure (IBP) (systolic, diastolic, and mean), body temperature, pulse oximetry (SpO2), mixed venous oxygenation (SvO2), cardiac output, end-tidal carbon dioxide (ETCO2), intracranial pressure, airway gas concentrations, or a combination thereof. The ports 610, 612, 614, 616 may be accessible through the left housing opening 124 formed in the left wall portion 118 of the outer wall 112 of the rear housing portion 102. The support bracket 602 may further include a window, or opening, through which the user interface 192 of the monitor 100 may be viewed while the monitor 100 is engaged with the support bracket.

All examples and conditional language recited herein are intended for pedagogical purposes to aid the reader in understanding the principles of the present invention and the concepts contributed by the inventor in furthering the art. As such, they are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the invention. All such variations and modifications are intended to be included within the scope of the invention, as defined by the following claims.

What is claimed is:

1. A patient monitor device, comprising:
an outer housing having a rear housing portion and a front housing portion;
an inner case at least partially disposed within the rear housing portion of the outer housing and enclosed by the front housing portion, wherein the inner case includes a plurality of ports adapted to receive cables from a plurality of physiological sensors;
a processor disposed within the inner case, the processor being adapted to interpret signals received from the plurality of physiological sensors; and
a heat sink disposed between the front housing portion of the outer housing and the inner case, wherein the heat sink includes an outer heat dissipation channel around an outer periphery of the heat sink, wherein the heat dissipation channel is in direct contact with ambient air to dissipate from the processor within the inner case.

2. The patient monitor device of claim 1, wherein the rear housing portion, the front housing portion, and the outer heat dissipation channel define a heat dissipation opening, wherein the heat dissipation opening is sized and shaped to prevent a human finger from coming into contact with the outer heat dissipation channel.

3. The patient monitor device of claim 1, wherein the front housing portion comprises an outer wall formed with a channel and a distal end of the heat sink fits into the channel of the front housing portion.

4. The patient monitor device of claim 3, wherein the outer heat dissipation channel of the heat sink is adjacent to the distal end of the heat sink.

5. The device of claim 1, further comprising a support bracket that is adapted to receive the patient monitoring device and engage the heat sink to facilitate removal of heat from the patient monitoring device, wherein the support bracket includes at least one support structure that is sized and shaped to fit into and engage the outer heat dissipation channel of the heat sink.

6. The device according to claim 1, wherein the outer housing comprises a thermally insulating material.

7. The device according to claim 6, wherein the thermally insulating material comprises a thermally insulating plastic.

8. The device according to claim 1, wherein the inner case, the heat sink, or a combination thereof comprises a thermally conductive material.

9. The device according to claim 8, wherein the thermally conductive material comprises a thermally conductive metal.

10. An apparatus, comprising: a user interface module comprising a user interface enclosure that at least partially contains a display, the user interface enclosure having a rear user interface edge; a computer comprising a processor and memory, the computer being electrically connected to the user interface module, the computer being adapted to display information on the display; a thermal enclosure having a heat sink attached to a rear enclosure, the computer being located within the rear enclosure, the heat sink being positioned between the rear enclosure and the user interface module, the heat sink being thermally connected to the processor, the heat sink having an outer heat sink wall extending around at least a portion of a perimeter of the heat sink; and a cover that at least partially envelops the rear enclosure, the cover having a front cover edge; and a plurality of sensor ports, each of the plurality of sensor ports being capable of being connected to a physiological sensor and to receive signals from the physiological sensor that are presentative of a physiological parameter of a patient; wherein the computer is electrically connected to the plurality of ports and is adapted to receive the signals, store data representative of the received signals and display information on the display representative of the received signals; wherein the outer heat sink wall is positioned between and recessed below the front cover edge and the rear user interface edge, the heat sink wall, the front cover edge, and the rear user interface edge defining a heat sink channel that is exposed to ambient air surrounding the apparatus; wherein the thermal enclosure is formed of materials having greater thermal conductivity than the cover and user interface enclosure.

11. The apparatus of claim 10, wherein the outer heat sink channel is adapted to prevent a human finger from touching the outer heat sink wall.

12. The apparatus of claim 10, wherein the outer heat sink wall is the only portion of the heat sink that is exposed to the ambient air.

13. The apparatus of claim 10, wherein the outer heat sink wall is concave.

14. The apparatus of claim 10, further comprising a thermal gap pad and a heat spreader positioned between the processor and the heat sink.

\* \* \* \* \*